(12) United States Patent
Corradi et al.

(10) Patent No.: US 10,552,388 B2
(45) Date of Patent: Feb. 4, 2020

(54) NULL REPLACING ATTRIBUTES

(71) Applicant: SAP SE, Walldorf (DE)

(72) Inventors: Davide Corradi, Heidelberg (DE);
Daniel Patejdl, Karlsruhe (DE);
Christoph Weyerhaeuser, Leimen
(DE); Johannes Merx, Heidelberg
(DE); Julian Schwing, Heidelberg (DE)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 15/402,779

(22) Filed: Jan. 10, 2017

(65) Prior Publication Data

US 2018/0196833 A1   Jul. 12, 2018

(51) Int. Cl.
*G06F 16/215* (2019.01)
*G06F 16/25* (2019.01)

(52) U.S. Cl.
CPC ............ *G06F 16/215* (2019.01); *G06F 16/25* (2019.01)

(58) Field of Classification Search
CPC ............................... G06F 16/25; G06F 16/215
See application file for complete search history.

(56) References Cited

U.S. PATENT DOCUMENTS

| | | | |
|---|---|---|---|
| 6,965,888 B1* | 11/2005 | Cesare | G06F 16/215 707/708 |
| 7,912,842 B1* | 3/2011 | Bayliss | G06F 16/2471 707/749 |
| 2009/0271359 A1* | 10/2009 | Bayliss | G06F 16/285 706/54 |
| 2018/0004363 A1* | 1/2018 | Tompkins | G06F 3/0482 |

* cited by examiner

*Primary Examiner* — Albert M Phillips, III
(74) *Attorney, Agent, or Firm* — Mintz Levin Cohn Ferris Glovsky and Popeo, P.C.

(57) ABSTRACT

Described herein includes finding and replacing, including automatically, at least one null value in a table for allowing processing of the table with an ABAP-based application. In some implementations, the null values are replaced with replacement values that are compatible with further processing of the data in the table. For example, a replacement value can be a string providing information or a value, such as for performing a calculation.

20 Claims, 9 Drawing Sheets

FIG. 1

| product_id | product_name |
|---|---|
| 0 | plastic bag |
| 1 | oranges |
| 2 | paper towels |
| 3 | milk |
| 4 | chewing gum |
| 5 | T-shirt |
| 6 | sweater |
| ... | ... |

| product_id | price |
|---|---|
| 0 | 0.00 |
| 1 | 0.49 |
| 2 | 0.98 |
| 3 | 0.79 |
| 4 | 1.29 |
| 5 | NULL |
| 6 | NULL |
| ... | ... |

| product_id | amount_sold |
|---|---|
| 0 | 50 |
| 1 | 25 |
| 2 | 10 |
| 3 | 15 |
| 4 | 5 |
| 5 | 0 |
| 6 | 0 |
| ... | ... |

| Product: | Price: | Amount Sold: |
|---|---|---|
| plastic bag | 0.00 | 50 |
| oranges | 0.49 | 25 |
| paper towels | 0.98 | 10 |
| milk | 0.79 | 15 |
| chewing gum | 1.29 | 5 |
| T-shirt | *(not yet determined)* | 0 |
| sweater | *(not yet determined)* | 0 |

Total revenue:
50 * 0.00 (plastic bag)
+ 25 * 0.49 (oranges)
+ 10 * 0.98 (paper towels)
+ 15 * 0.79 (milk)
+ 5 * 1.29 (chewing gum)
+ 0 * *0.00* (T-shirt)
+ 0 * *0.00* (sweater)
———
= 130.35

| country | plant |
|---|---|
| Germany | Berlin |
| Germany | Munich |
| USA | New York |
| USA | Los Angeles |
| USA | Miami |
| France | Paris |
| *unknown* | *unknown* |

| plant | product |
|---|---|
| Berlin | product_a |
| Munich | product_b |
| New York | product_a |
| Los Angeles | product_b |
| Miami | product_c |
| Paris | product_a |

| product | customer |
|---|---|
| product_a | customer_1 |
| product_b | customer_2 |
| product_c | customer_3 |
| product_x | customer_4 |
| product_a | customer_5 |

306

| customer | product | plant |
|---|---|---|
| customer_1 | product_a | Berlin |
| customer_1 | product_a | New York |
| customer_1 | product_a | Paris |
| customer_2 | product_b | Munich |
| customer_2 | product_b | Los Angeles |
| customer_3 | product_c | Miami |
| customer_4 | product_x | *unknown* |
| customer_5 | product_a | Berlin |
| customer_5 | product_a | New York |
| customer_5 | product_a | Paris |

| customer | product | plant |
|---|---|---|
| customer_1 | product_a | Berlin |
| customer_1 | product_a | New York |
| customer_1 | product_a | Paris |
| customer_2 | product_b | Munich |
| customer_2 | product_b | Los Angeles |
| customer_3 | product_c | Miami |
| customer_4 | product_x | *NULL* |
| customer_5 | product_a | Berlin |
| customer_5 | product_a | New York |
| customer_5 | product_a | Paris |

| customer | product | plant | country |
|---|---|---|---|
| customer_1 | product_a | Berlin | Germany |
| customer_1 | product_a | New York | USA |
| customer_1 | product_a | Paris | France |
| customer_2 | product_b | Munich | Germany |
| customer_2 | product_b | Los Angeles | USA |
| customer_3 | product_c | Miami | USA |
| customer_4 | product_x | *unknown* | *unknown* |
| customer_5 | product_a | Berlin | Germany |
| customer_5 | product_a | New York | USA |
| customer_5 | product_a | Paris | France |

NULL REPLACING ATTRIBUTES

TECHNICAL FIELD

The subject matter described herein relates to detecting and replacing null values in a table for further processing of the table.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS (IM-DBMS) available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

Furthermore, various applications can be used to analyze data, such as data tables. For example, Advanced Business Application Programming (ABAP, available from SAP SE, Walldorf, Germany) can use a calculation engine of HANA, such as for analyzing and/or compiling information contained in one or more tables. Although specific types of systems, such as ABAP and HANA, are referred to in some of the examples described herein, these are merely examples as other systems may be used as well.

SUMMARY

Aspects of the current subject matter can include detecting and replacing null values in a table for further processing of the table.

In one aspect, a method can includes detecting a null value in a first table received by a calculation engine of a database management system. The method can further include determining a replacement value for the detected null value. The replacement value can enable a calculation using data in the first table. Furthermore, the method can include replacing, in the first table, the null value with the replacement value. The method can also include executing the calculation using the data in the first table. The data in the first table can include the replacement value.

In optional variations, one or more of the features herein, including the following features, can be included in any feasible combination. The replacement value can include one or more of a string, a numerical value, a time value, and a date value. The calculation can include a join of the first table with a second table. The null value can include an undefined value. The method can further include receiving an instruction associated with a column in the first table. The instruction can include a type of replacement value to be used to replace null value in the column. The method can further include determining the null value is in the column and replacing the null value according to the instruction. Furthermore, the method can include detecting a second null value in the second table and replacing the second null value with a second replacement value. The executing of the join can further include executing the join of the first table and the second table to form a third table. The third table can include the first replacement value and the second replacement value.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some databases, a null value can be used to express that a value in a database table has no applicable information, for example, is unknown or does not exist. Null values can lead to various problems in some systems including, for example, ABAP-based applications, such as ones that use the calculation engine of SAP HANA, since the null value is not recognized in ABAP, as well as other applications and/or databases. To work around this issue, users can model their calculation scenarios in a way that null values are not exposed to an application, such as the ABAP layer. For example, in a column that normally holds integer values, a potential null value can be replaced by a zero value. For a character or string-based column, the null value can be replaced by an empty string. Since a database table can consist of multiple columns that can hold multiple null values and since a complex user scenario often consumes multiple tables, manually introducing attributes to replace null values of all columns involved can be time and labor intensive.

The present subject matter includes finding and replacing, including automatically, null values in table columns of a database table (also referred to as tables) for allowing processing of the table with an application, such as an ABAP-based application, as well as other applications.

In some implementations, the user may only needs to specify, for a given column c having data type t, whether to replace null values in column c. In addition, a user can specify a value v (of, or being convertible to type t) that can be used instead of the null value, such that any null value that appears in in column c will be replaced by value v. For example, if the user does not specify a value, the calculation engine default value (depending on t) can be used.

In some embodiments, the null value replacement can be done by introducing a new calculated column for column c on the specific calculation node. Since column c is consumed by another node (or produces the final query result), it can be required to be renamed. For example, the source column c can be renamed to column c'. The newly introduced calculated attribute can be named column c and consumes c' in the expression that handles the null value replacement. This can require that all renaming (also called mapping) from the source node are handled in a correct way (e.g., the target column c of a mapping is changed to target column c'). The calculation engine can implicitly introduce calculated attributes using a proper expression to find and replace null values. In contrast, doing this manually can be error-prone.

An example of the present subject matter includes a user specifying for a given string column named "telephone_number" instructions to replace any null values appearing in the data table. The null value can be instructed to be replaced by a string value (e.g., "not available"). The calculation engine can thus introduce a calculated attribute, which can be named similar to the original column determined by an expression that checks the null value, and, if it finds it, the null value can be replaced by the string value "not available." Upper layers (e.g., ABAP) can thereafter no longer detect or see null values for that column but can see the string value (e.g., "not available").

Figure 1:
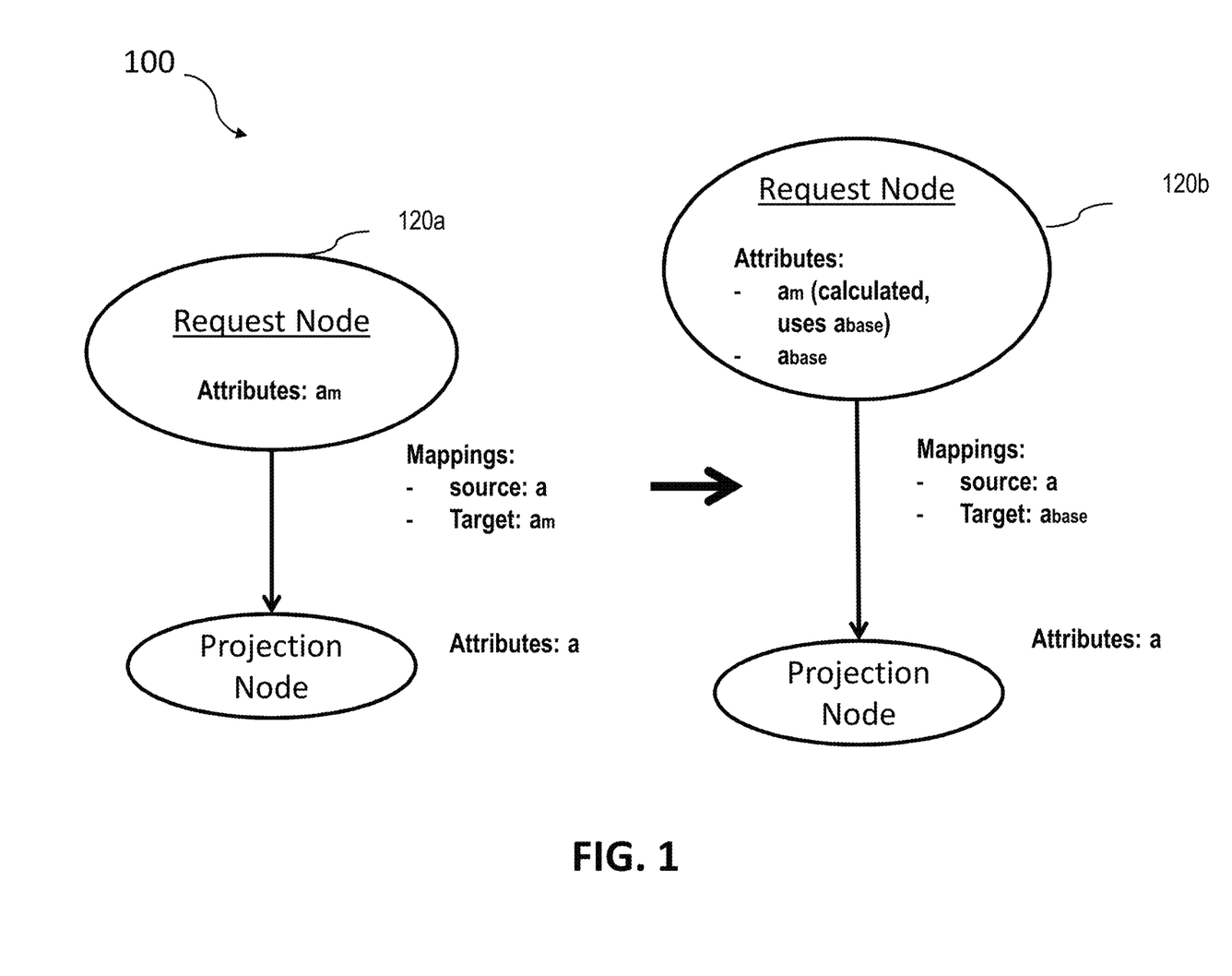
FIG. 1 shows an example null value replacement of a first attribute.

FIG. 1 illustrates an example flow diagram 100 showing a null value attribute ($a_m$) of data (e.g., based on an attribute (a) of data of a succeeding projection node) before replacement at a request node 120a and the replaced null value at the request node 120b. According to an implementation of the subject matter disclosed herein, a new calculated attribute ($a_m$) can be introduced at the request node 120b and the old attribute ($a_m$) can be renamed (e.g., $a_{base}$). The renamed attribute can be used in the expression of a newly introduced calculated attribute ($a_m$). The expression of the calculated attribute can be used to find and replace null values of the old or renamed attribute. Additionally, the existing mapping (source: a, target: $a_m$) can be changed to (source: a, target: $a_{base}$). For example, renaming the old attribute, creating the new calculated attribute and its expression, as well as adapting existing mappings can all be done automatically by the calculation engine.

Figure 2A:
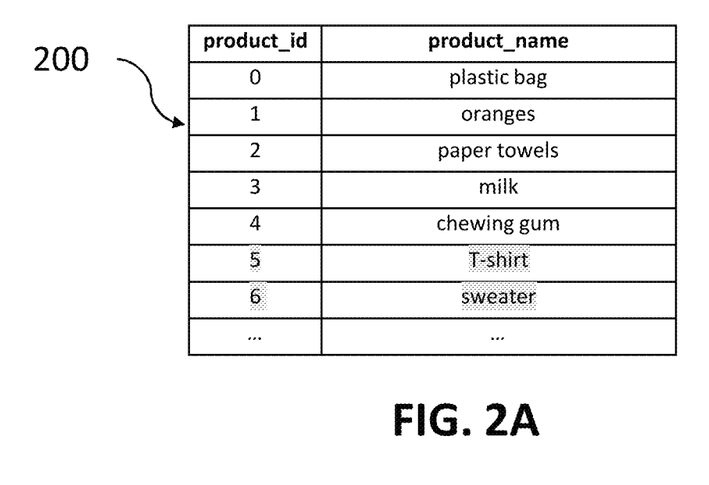
FIG. 2A shows an example first table having a product identification column and a product name column.
Figure 2B:
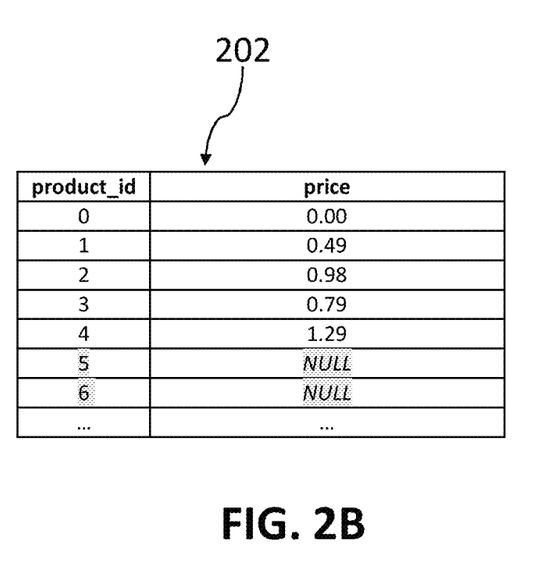
FIG. 2B shows an example second table having a product identification column and a product price column with the product price column including null values.
Figure 2C:
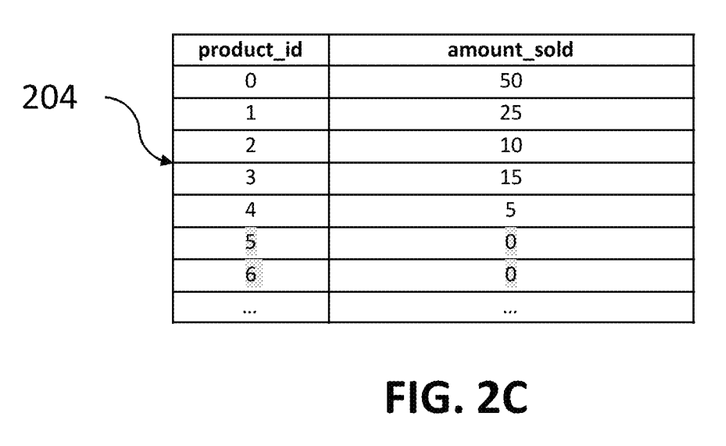
FIG. 2C shows an example third table having a product identification column and a product amount sold column with the product amount sold column including zero values.

FIGS. 2A-2F illustrate an embodiment and example application of the subject matter disclosed herein. For example, FIG. 2A illustrates a first table 200 including a column of product identifications ("product_id") and a column of product names (product_name). In this example, the products "T-shirt" and "sweater" (product IDs: 5 and 6, respectfully) have not been sold before and their prices have not been determined. As such, as shown in FIG. 2B, a second table 202 showing the current product prices for the products listed in the first table 200 include null values for product IDs 5 and 6. Additionally, as shown in FIG. 2C, a third table 204 showing the current amounts sold for the products listed in the first table 200 include zero values for product IDs 5 and 6.

Figures 2D, 2E:
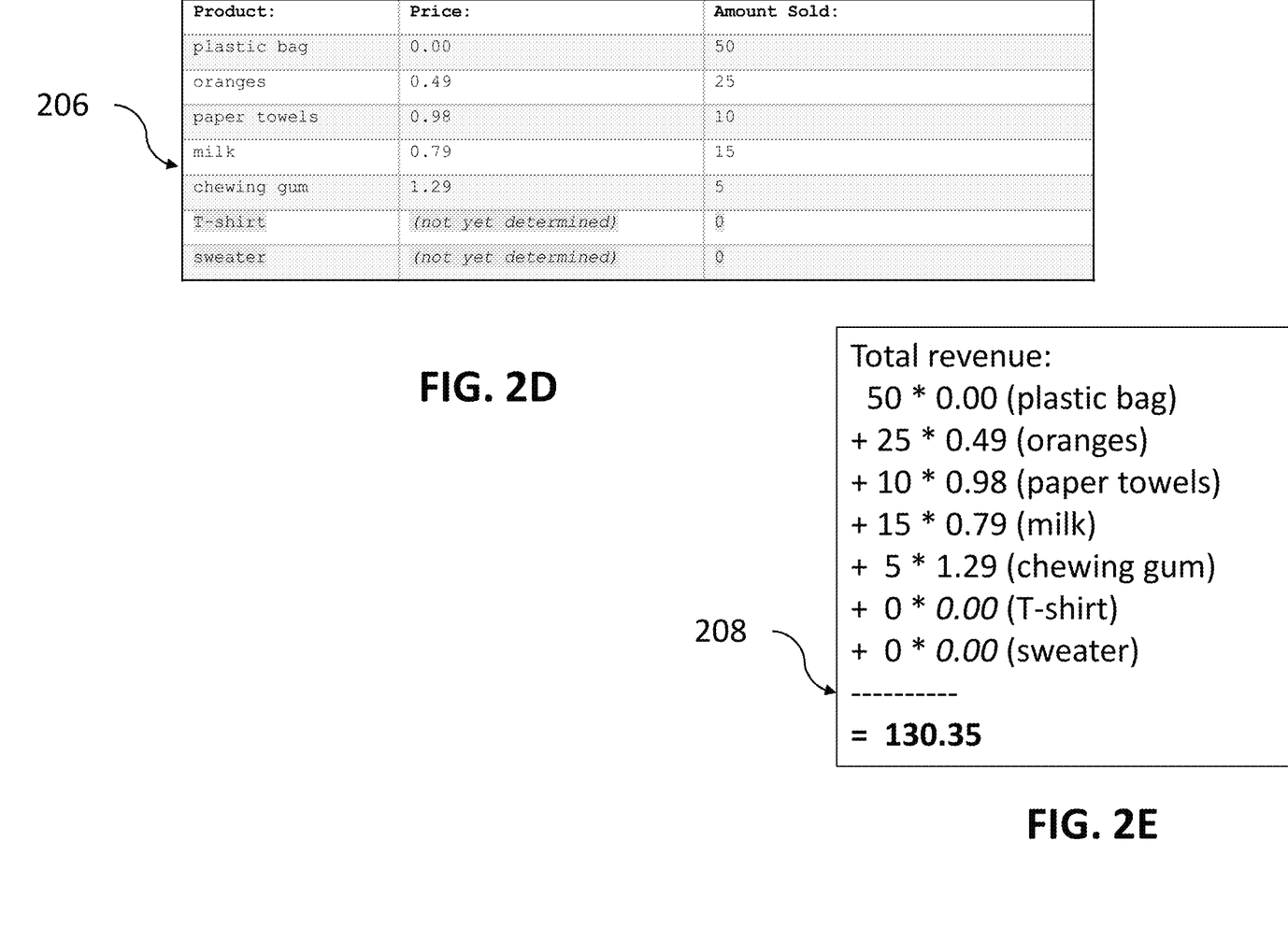
FIG. 2D shows a first part of an example sales report showing a fourth table including information from the first, second, and third tables and including replacement value in place of the null value.
FIG. 2E shows a second part of the example sales report showing calculations of total revenue based on the first, second, and third tables and including replacement null values.

A fourth table 206 shown in FIG. 2D illustrates a first part of a sales report and a report calculation 208 shown in FIG. 2E illustrates another part of the sales report (the sales revenue). The fourth table 206 and the report calculation 208 are both based on the information contained in the tables shown in FIGS. 2A-2C and using the null value replacement features described herein. For example, in FIG. 2D, the null values have been replaced by a string ("not yet determined"). In FIG. 2E, the null values have been replaced by the number 0.00, which allows the sales revenue calculation to be completed instead of creating a calculation error since multiplying anything by a null value results in a null in database theory.

Figure 2F:
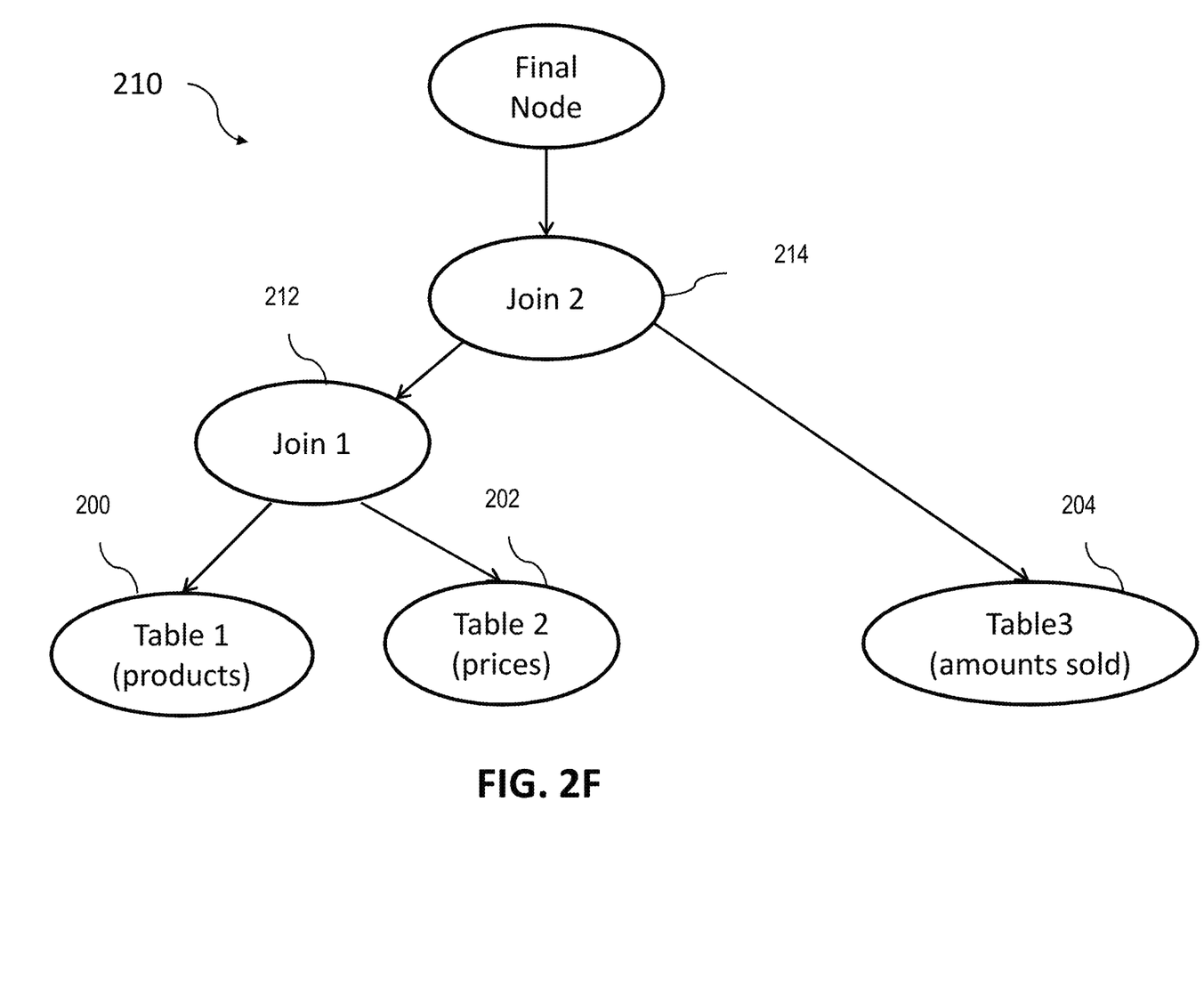
FIG. 2F illustrates an example calculation scenario used to process the sales report.

FIG. 2F illustrates a calculation scenario 210 used to generate the sales report information shown in the fourth table 206 and the report calculation 208. For example, the Join 1 node 212 is used to join the products and prices tables (first and second tables 200, 202, respectively) using the product_id as a join column. The Join 2 node 214 is used to join the results from the Join 1 node 212 and the amounts sold table (third table 204) using the product_id as the join column. Since null values for the price column must not appear in the final sales report (e.g., fourth table 206), the Join 1 node needs to replace null prices by a suitable number. In this case, the string "not yet determined" is used as a replacement value for the sales report table (the fourth table 206) and the value 0.00 is used as a replacement value for the sales report revenue calculation 208. Such replacements allow for the sales report to be produced with meaningful information and prevent errors when performing calculations.

Figure 3A:
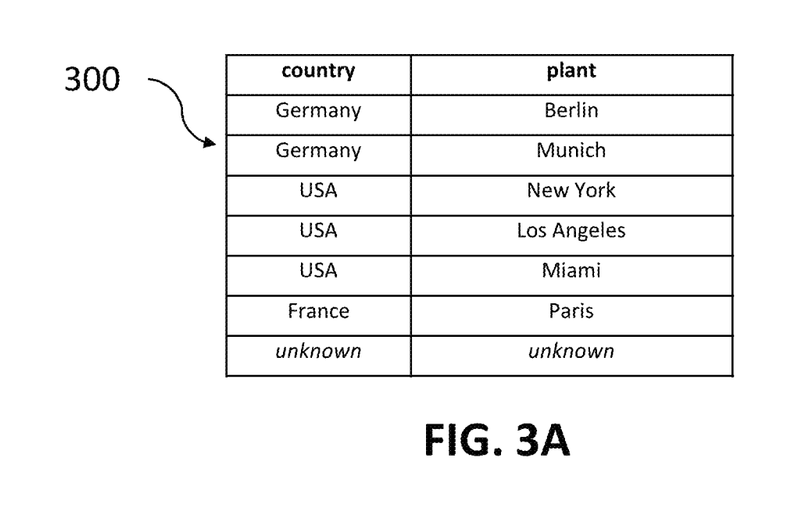
FIG. 3A shows an example fifth table listing a company's factory or plant locations.
Figure 3B:
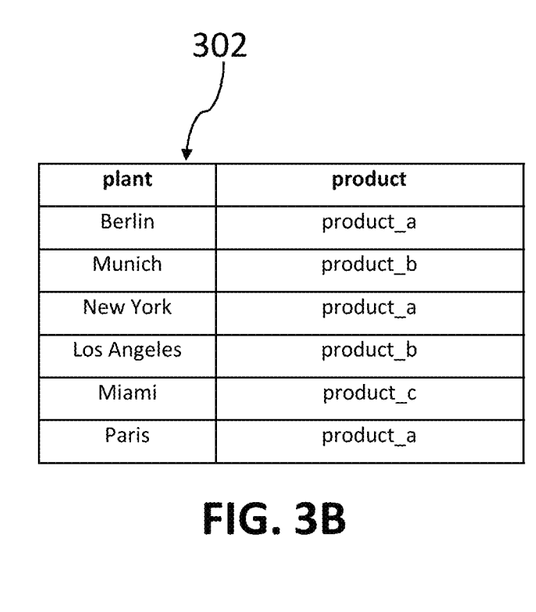
FIG. 3B shows an example sixth table containing information regarding which products are manufactured in the factories listed in the fifth table.
Figure 3C:
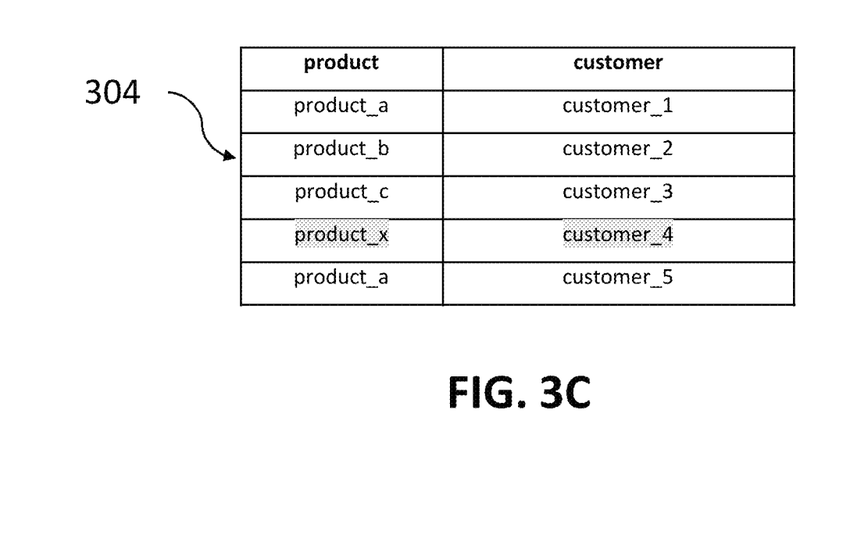
FIG. 3C shows an example seventh table containing information regarding customer's ordered products.

FIGS. 3A-3B illustrate another example application of the subject matter disclosed herein. For example, FIG. 3A shows an example fifth table 300 including a company's factory or plant locations (e.g., Berlin, Germany). The (unknown, unknown) entry in the fifth table 300 is a special identification row that assists with null value replacements, as will be discussed in greater detail below. FIG. 3B shows an example sixth table 302 including information regarding which products are manufactured in the factories listed in the fifth table 300. FIG. 3C shows an example seventh table 304 containing information regarding customer's ordered products listed in the sixth table 302. The business logic executed using the fifth, sixth, and seventh tables 300, 302, and 304, respectively, can include determining which ordered product of a customer can be produced in which plant or country.

Figure 3D:
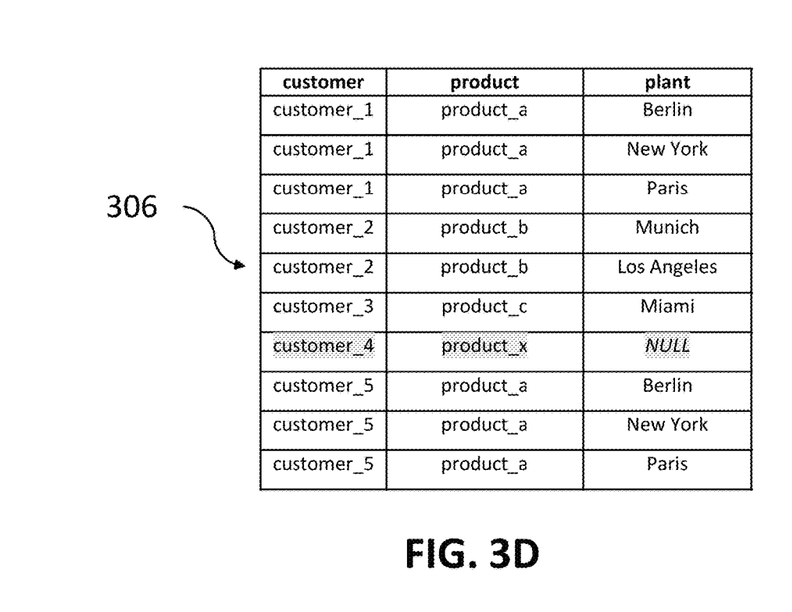
FIG. 3D shows an example eighth table containing compiled information from the fifth, sixth, and seventh tables and including a null value.
Figure 3E:
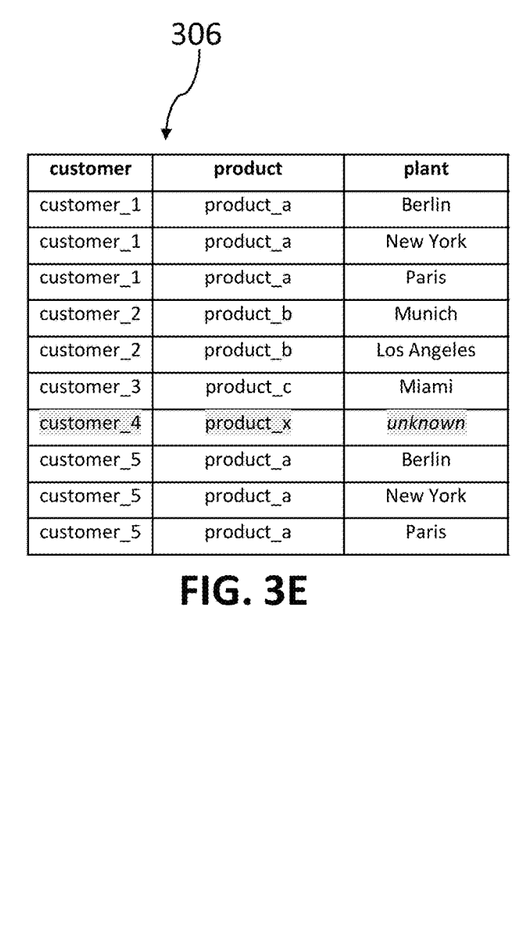
FIG. 3E shows the eight table shown in FIG. 3D with a replacement value in place of the null value.
Figure 3F:
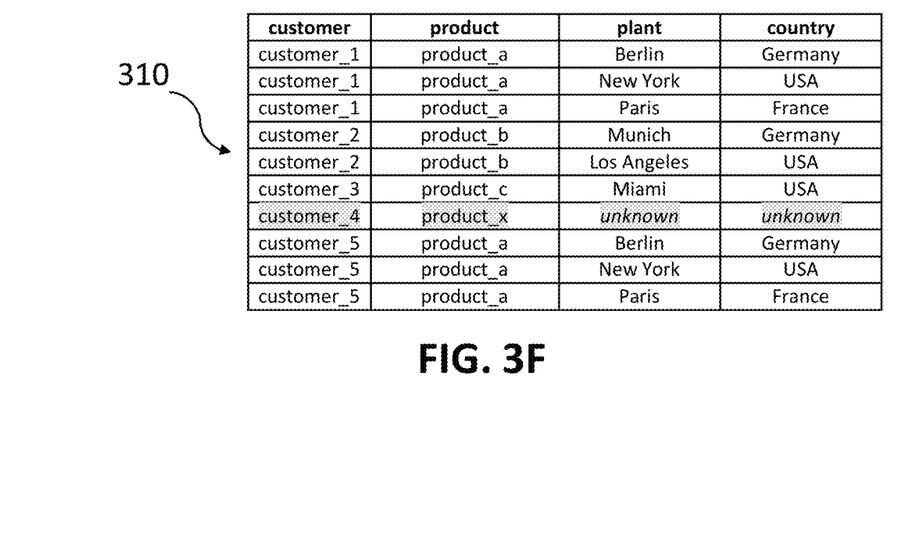
FIG. 3F shows an example ninth table containing further compiled information from the fifth, sixth, and seventh tables and including replacement values in place of null values.

For example, if customer_5 orders product_a, the business logic can determine which factories may be considered for production of product_a. To model this business logic, a calculation scenario performing null replacement can be used that joins together the fifth, sixth, and seventh tables 300, 302, and 304, respectively. For example, the first join can be a left outer joint that joins the sixth and seventh tables 302 and 304, respectively, to form an eighth table 306, as shown in FIG. 3D, using the product column as the join attribute. As shown in FIG. 3D, a null value appears in the plant column for customer_4 in the eighth table 306. For the plant column, a null replacement can be performed thereby replacing any null values with a string value ("unknown"), as shown in the eight table 306 in FIG. 3E. Furthermore, as shown in FIG. 3A, the fifth table 300 includes a special (unknown, unknown) row that can be used for the second join to form a ninth table 310, as shown in FIG. 3F. Due to the null values of the plant column being replaced in the first join by the value "unknown", it is possible for the processor to find a matching value in the fifth table 300 in the second join. As with the previous example, the null value replacements are essential for creating the ninth table with the additional row, e.g., the entire (customer_4, product_x, unknown, unknown) row would not have been in the result set had the null value replacement not been performed. As such, the present application allows for more correct and thorough processing and presenting of data contained in data tables.

Figure 4:
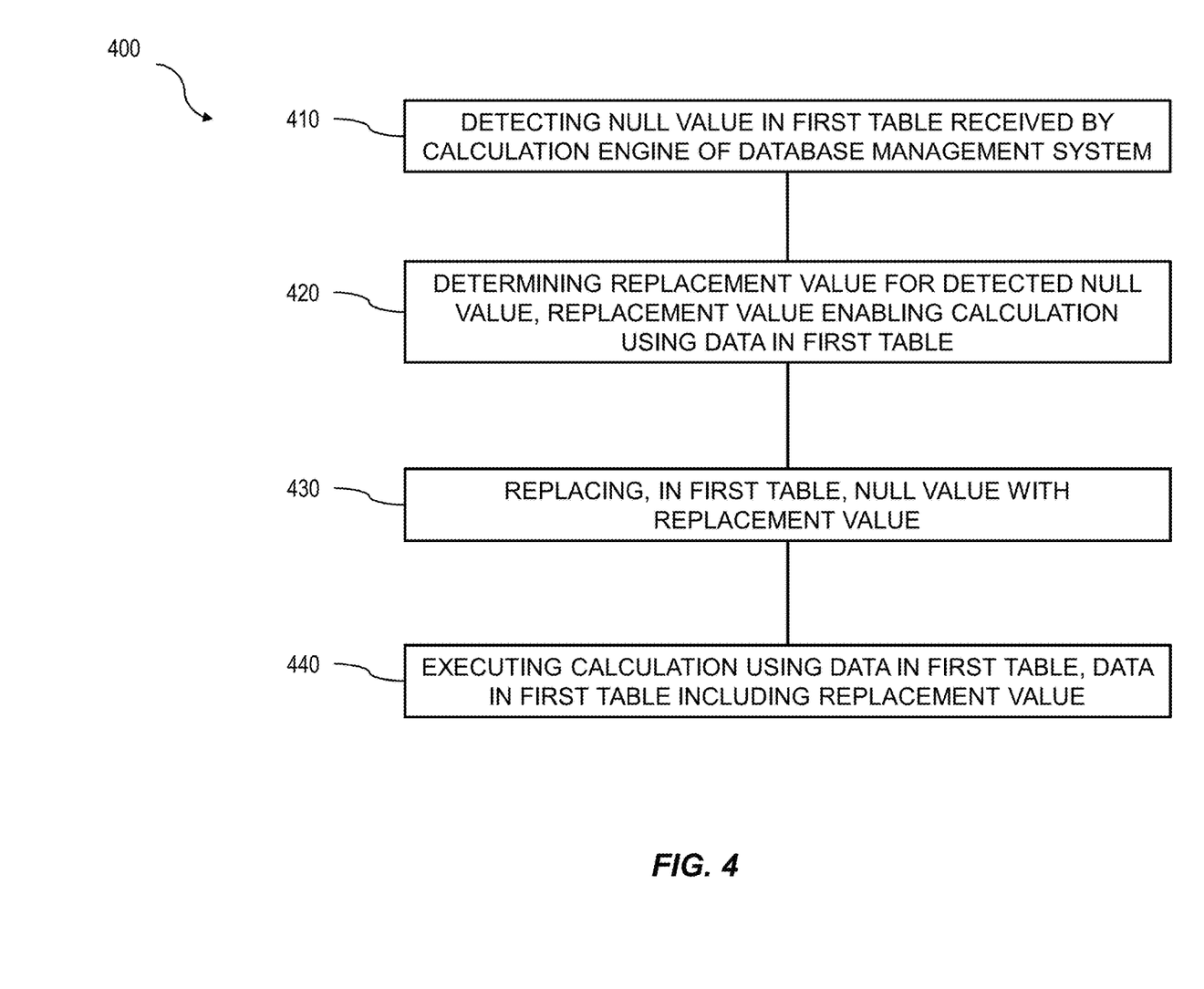
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. It will be understood that other implementations may include or exclude certain features.

At 410, a null value can be detected in a first table received by a calculation engine of a database management system. For example, the first table can include a column having a null value representing an undefined value. Some calculations performed by the calculation engine can produce an error if a null value is included in the calculation. As such, removing and replacing (e.g., with a numerical value) the null value from the first table can reduce or eliminate calculation errors.

At 420, a replacement value for the detected null value can be determined. The replacement value can enable a calculation using data in the first table. In some implementations, the calculation can include a join, such as a join of the first table with at least one other table. The calculation of the join with the first table having the replacement value can be performed without resulting in a calculation error.

At 430, the null value in the first table can be replaced with the replacement value. For example, the replacement value can include at least one of a string, a numerical value, a time value, and a date value.

At 440, the calculation using the data in the first table can be executed. The data in the first table can include the replacement value. For example, executing the calculation can include performing a join of the first table (including the replacement value) with a second table. The join executed by the calculation engine with the first table having the replacement value (and not the null value) can be prevented from resulting in calculation errors.

Figure 5:
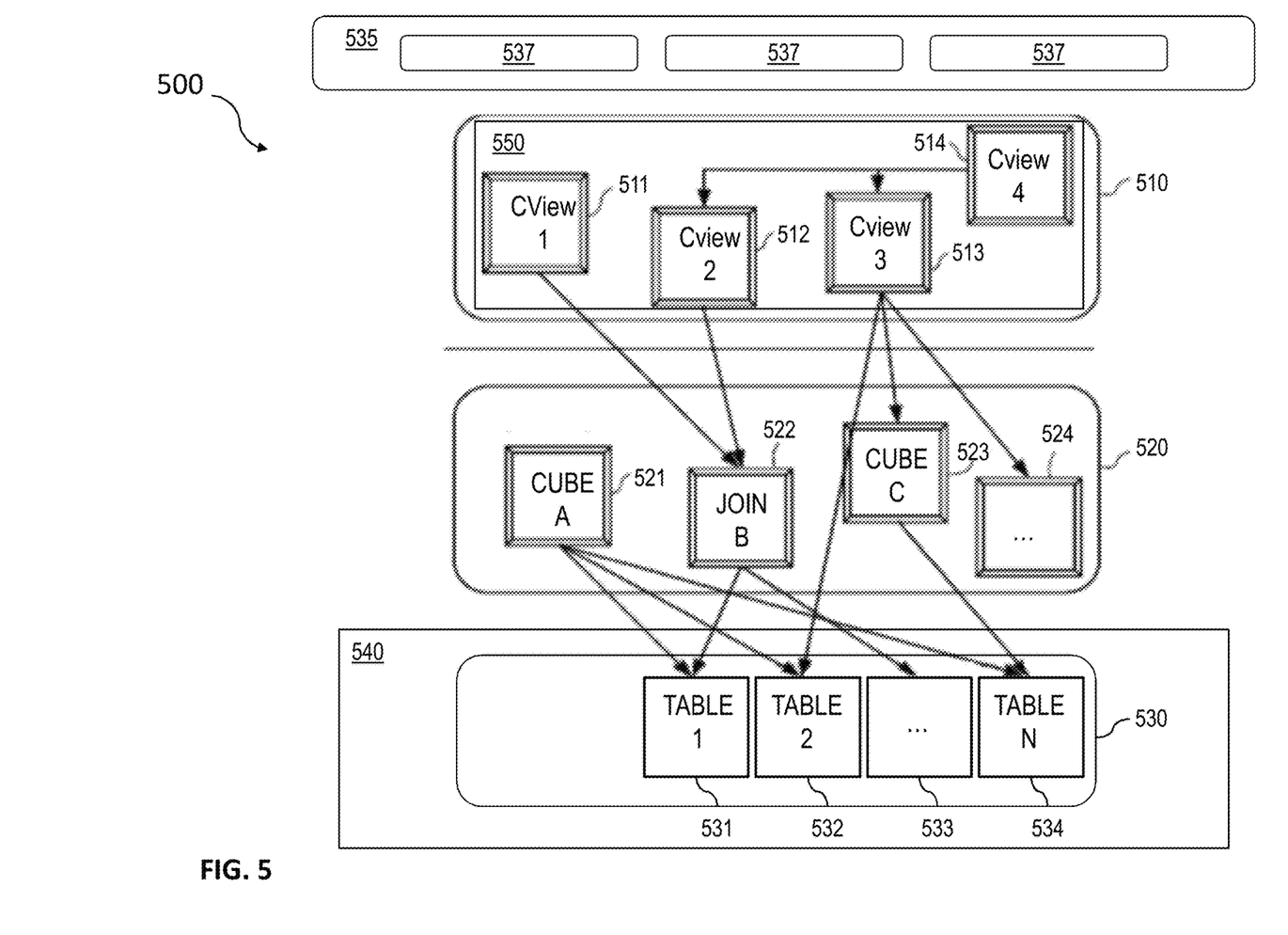
FIG. 5 shows a diagram illustrating a computing architecture consistent with implementations of the current subject matter including a database system that includes three layers: a calculation engine layer, a logical layer, and a physical table-pool.

FIG. 5 is a diagram that illustrates a computing architecture 500 including a database system that includes three layers: a calculation engine layer 510, a logical layer 520, and a physical table-pool 530. One or more application servers 535 implementing database client applications 537 can access the database system. Calculation scenarios can be executed by a calculation engine, which can form part of a database or which can be part of the calculation engine layer 510 (which is associated with the database). The calculation engine layer 510 can be based on and/or interact with the other two layers, the logical layer 520 and the physical table pool 530. The basis of the physical table pool 530 consists of physical tables (called indexes) containing the data, which can be stored on one more database servers 540. Various tables 531-534 can be joined using logical metamodels 521-524 defined by the logical layer 520 to form an index. For example, any of the various tables 531-534 can be processed using the ABAP layer, including the null replacement application, as described above (e.g., with respect to FIGS. 1-4). In some implementations, the tables 531-334 in a cube (e.g. an online analytical processing or "OLAP" index) can be assigned roles (e.g., fact or dimension tables) and joined to form a star schema. It is also possible to form join indexes (e.g. join index B 522 in FIG. 5), which can act like database views in computing environments such as the Fast Search Infrastructure (FSI) available from SAP SE of Walldorf, Germany, although other types of infrastructures may be used as well.

As stated above, a calculation scenario 550 can include individual nodes (e.g. calculation nodes) 511-314, which in turn each define operations such as joining various physical or logical indexes and other calculation nodes (e.g., CView 4 is a join of CView 2 and CView 3). That is, the input for a node 511-514 can be one or more physical, join, or OLAP indexes or calculation nodes.

In a calculation scenario 550, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 550 can be created which can be reused by multiple queries even if such queries do not require every attribute specified by the calculation scenario 550.

Every calculation scenario 550 can be uniquely identifiable by a name (e.g., the calculation scenario 550 can be a database object with a unique identifier, etc.). Accordingly, the calculation scenario 550 can be queried in a manner similar to a view in a SQL database. Thus, the query is forwarded to the calculation node 511-514 for the calculation scenario 550 that is marked as the corresponding default node. In addition, a query can be executed on a particular calculation node 511-514 (as specified in the query). Furthermore, nested calculation scenarios can be generated in which one calculation scenario 550 is used as source in another calculation scenario (e.g. via a calculation node 511-514 in this calculation scenario 550). Each calculation node 511-514 can have one or more output tables. One output table can be consumed by several calculation nodes 511-414.

Figure 6:
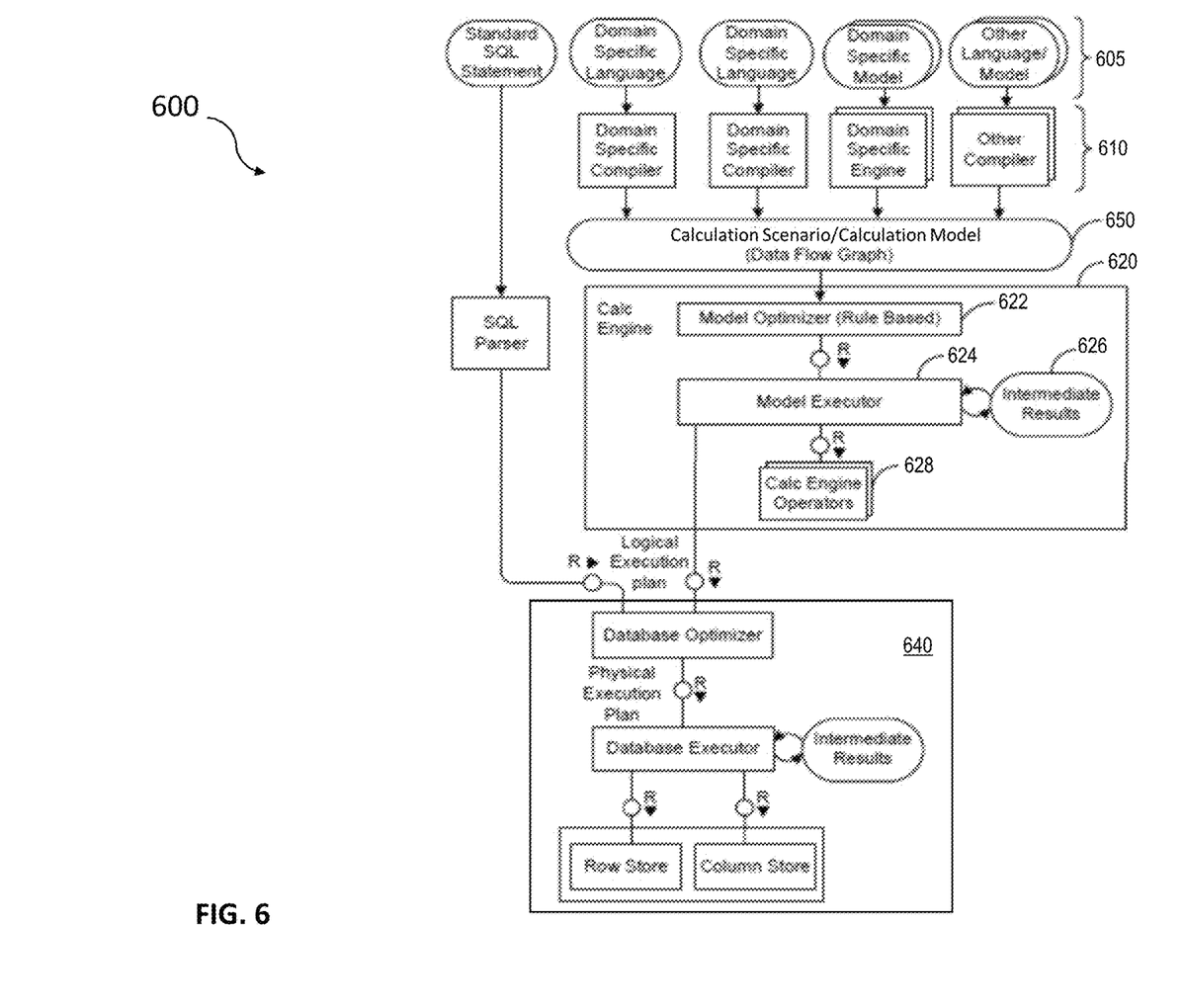
FIG. 6 shows a diagram illustrating a sample architecture for request processing and execution control consistent with implementations of the current subject matter.

FIG. 6 is a diagram 600 illustrating a sample architecture for request processing and execution control, such as for processing using the ABAP layer, including the null replacement application, as described above (e.g., with respect to FIGS. 1-4). As shown in FIG. 6, artifacts 605 in different domain specific languages can be translated by their specific compilers 610 into a common representation called a "calculation scenario" 650 (which is also referred to in in FIG. 6 as a calculation model). To achieve enhanced performance, the models and programs written in these languages are executed inside the database server 640. This arrangement eliminates the need to transfer large amounts of data between the database server 640 and a client application 437, which can be executed by an application server 435. Once the different artifacts 605 are compiled into this calculation scenario, they can be processed and executed in the same manner. A calculation engine 620 executes the calculation scenarios 650.

A calculation scenario 650 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 650 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 650 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 650 can be defined as part of database metadata and invoked multiple times. A calculation scenario 650 can be created, for example, by a SQL statement "CREATE CALCULATION SCENARIO <NAME> USING <XML or JSON>". Once a calculation scenario 650 is created, it can be queried (e.g., "SELECT A, B, C FROM <scenario name>", etc.). In some cases, databases can have pre-defined calculation scenarios 650 (default, previously defined by users, etc.). Calculation scenarios 650 can be persisted in a repository (coupled to the database server 640) or in transient scenarios. Calculation scenarios 650 can also be kept in-memory.

Calculation scenarios 650 are more powerful than traditional SQL queries or SQL views for many reasons. One reason is the possibility to define parameterized calculation schemas that are specialized when the actual query is issued. Unlike a SQL view, a calculation scenario 650 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 650 may contain an aggregation node containing all attributes. Later, the attributes for grouping can be supplied with the query. This allows having a predefined generic aggregation, with the actual aggregation dimensions supplied at invocation time. The calculation engine 620 can use the actual parameters, attribute list, grouping attributes, and the like supplied with the invocation to instantiate a query specific calculation scenario 650. This instantiated calculation scenario 650 is optimized for the actual query and does not contain attributes, nodes or data flows that are not needed for the specific invocation.

When the calculation engine 620 gets a request to execute a calculation scenario 650, it can first optimize the calculation scenario 650 using a rule based model optimizer 622. Examples for optimizations performed by the model optimizer can include "pushing down" filters and projections so that intermediate results 626 are narrowed down earlier, or the combination of multiple aggregation and join operations into one node. The optimized model can then be executed by a calculation engine model executor 624 (a similar or the same model executor can be used by the database directly in some cases). This includes decisions about parallel execution of operations in the calculation scenario 650. The model executor 624 can invoke the required operators (using, for example, a calculation engine operators module 628) and manage intermediate results. Most of the operators are executed directly in the calculation engine 620 (e.g., creating the union of several intermediate results). The remaining nodes of the calculation scenario 650 (not implemented in the calculation engine 620) can be transformed by the model executor 624 into a set of logical database execution plans. Multiple set operation nodes can be combined into one logical database execution plan if possible.

The calculation scenarios 650 of the calculation engine 620 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 620 to execute the calculation scenario 650 behind the calculation view. In some implementations, the calculation engine 620 and the SQL processor are calling each other: on one hand the calculation engine 620 invokes the SQL processor for executing set operations and SQL nodes and, on the other hand, the SQL processor invokes the calculation engine 620 when executing SQL queries with calculation views.

The attributes of the incoming datasets utilized by the rules of model optimizer 622 can additionally or alternatively be based on an estimated and/or actual amount of memory consumed by the dataset, a number of rows and/or columns in the dataset, and the number of cell values for the dataset, and the like.

A calculation scenario 650 as described herein can include a type of node referred to herein as a semantic node (or sometimes semantic root node). A database modeler can flag the root node (output) in a graphical calculation view to which the queries of the database applications directed as semantic node. This arrangement allows the calculation engine 620 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
   at least one processor; and
   at least one memory including instructions which when executed by the at least one processor cause operations comprising:
   receiving an instruction associated with a column in a first table, the instruction including a user-defined replacement value to be used to replace one or more null values to be detected in the column for enabling a calculation using data in the first table;
   detecting, after the instruction is received, a first null value in the first table received by a calculation engine of a database management system;
   replacing, in the first table, the first null value with the user-defined replacement value; and
   executing the calculation using the data in the first table, the data in the first table including the user-defined replacement value.

2. The system of claim 1, wherein the user-defined replacement value includes one or more of a string, a numerical value, a time value, and a date value.

3. The system of claim 1, wherein the calculation includes a join of the first table with a second table.

4. The system of claim 1, wherein the first null value comprises an undefined value.

5. The system of claim 1, further comprising:
determining the first null value is in the column; and
replacing the first null value according to the instruction.

6. The system of claim 3, further comprising:
detecting a second null value in the second table; and
replacing the second null value with a second replacement value.

7. The system of claim 6, wherein the executing of the join further comprises:
executing the join of the first table and the second table to form a third table, the third table comprising the user-defined replacement value and the second replacement value.

8. A computer program product comprising a non-transitory computer-readable storage medium storing instructions that, when executed by at least one programmable processor, cause the at least one programmable processor to perform operations comprising:
receiving an instruction associated with a column in a first table, the instruction including a user-defined replacement value to be used to replace one or more null values to be detected in the column for enabling a calculation using data in the first table;
detecting, after the instruction is received, a first null value in the first table received by a calculation engine of a database management system;
replacing, in the first table, the first null value with the user-defined replacement value; and
executing the calculation using the data in the first table, the data in the first table including the user-defined replacement value.

9. The computer program product of claim 8, wherein the user-defined replacement value includes one or more of a string, a numerical value, a time value, and a date value.

10. The computer program product of claim 8, wherein the calculation includes a join of the first table with a second table.

11. The computer program product of claim 10, further comprising:
detecting a second null value in the second table; and
replacing the second null value with a second replacement value.

12. The computer program product of claim 8, further comprising:
determining the first null value is in the column; and
replacing the first null value according to the instruction.

13. The computer program product of claim 11, wherein the executing of the join further comprises:
executing the join of the first table and the second table to form a third table, the third table comprising the user-defined replacement value and the second replacement value.

14. A method for implementation by one or more data processors forming part of at least one computing system, the method comprising:
receiving an instruction associated with a column in a first table, the instruction including a user-defined replacement value to be used to replace one or more null values to be detected in the column for enabling a calculation using data in the first table;
detecting, after the instruction is received, a first null value in the first table received by a calculation engine of a database management system;
replacing, in the first table, the first null value with the user-defined replacement value; and
executing the calculation using the data in the first table, the data in the first table including the user-defined replacement value.

15. The method of claim 14, wherein the user-defined replacement value includes one or more of a string, a numerical value, a time value, and a date value.

16. The method of claim 14, wherein the calculation includes a join of the first table with a second table.

17. The method of claim 16, further comprising:
detecting a second null value in the second table; and
replacing the second null value with a second replacement value.

18. The method of claim 14, further comprising:
determining the first null value is in the column; and
replacing the first null value according to the instruction.

19. The method of claim 17, wherein the executing of the join further comprises:
executing the join of the first table and the second table to form a third table, the third table comprising the user-defined replacement value and the second replacement value.

20. The system of claim 1, further comprising:
receiving, at a user interface, an input from a user, the input defining the user-defined replacement value.

* * * * *